United States Patent
Schaefer

(10) Patent No.: US 8,931,031 B2
(45) Date of Patent: Jan. 6, 2015

(54) MATRIX CODE-BASED ACCESSIBILITY

(75) Inventor: Germar Schaefer, Monument, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 11 days.

(21) Appl. No.: 13/034,482

(22) Filed: Feb. 24, 2011

(65) Prior Publication Data

US 2012/0218470 A1    Aug. 30, 2012

(51) Int. Cl.
| | |
|---|---|
| H04N 7/16 | (2011.01) |
| H04N 21/41 | (2011.01) |
| H04N 21/236 | (2011.01) |
| H04N 21/434 | (2011.01) |
| H04N 21/435 | (2011.01) |
| H04N 21/81 | (2011.01) |

(52) U.S. Cl.
CPC ..... *H04N 21/4126* (2013.01); *H04N 21/23614* (2013.01); *H04N 21/4348* (2013.01); *H04N 21/4355* (2013.01); *H04N 21/8106* (2013.01); *H04N 21/8133* (2013.01)
USPC ............................ 725/141; 725/133; 348/461

(58) Field of Classification Search
USPC ......... 725/32–61, 131–134, 139–142, 78–82; 709/217–232; 348/461, 465, 478, 552, 348/564, 734; 455/3.06, 556.1–2
See application file for complete search history.

(56) References Cited

U.S. PATENT DOCUMENTS

| | | | |
|---|---|---|---|
| 4,809,325 A * | 2/1989 | Hayashi et al. | ............... 380/234 |
| 4,837,414 A | 6/1989 | Edamula | |
| 5,500,681 A | 3/1996 | Jones | |
| 5,510,603 A | 4/1996 | Hess et al. | |
| 5,581,636 A | 12/1996 | Skinger | |
| 5,602,377 A | 2/1997 | Beller et al. | |
| 5,703,349 A | 12/1997 | Meyerson et al. | |
| 5,959,285 A | 9/1999 | Schuessler | |
| 5,963,265 A * | 10/1999 | Bae et al. | ..................... 348/465 |
| 5,978,855 A | 11/1999 | Metz et al. | |
| 6,006,990 A | 12/1999 | Ye et al. | |

(Continued)

FOREIGN PATENT DOCUMENTS

| | | |
|---|---|---|
| CA | 2 634 951 A1 | 1/2010 |
| CN | 1571503 A | 1/2005 |

(Continued)

OTHER PUBLICATIONS

"Android App Reviews & Showcase Just a Tapp Away," Android Tapp, 10 pp. Found online at http://www.androidtapp.com/download-the-weather-channel-android-app-from-your-tv/, Oct. 22, 2010.

(Continued)

*Primary Examiner* — Annan Shang
(74) *Attorney, Agent, or Firm* — Kilpatrick Townsend & Stockton LLP

(57) ABSTRACT

A method of presenting a matrix code for providing accessibility content includes receiving, at a content receiver, a signal carrying accessibility content, generating, at the content receiver, a matrix code from the accessibility content, and transmitting the matrix code as part of a content presentation to a presentation device for display, wherein the content presentation includes at least one of audio and visual content and the accessibility content includes an alternative form of at least one of the audio and the visual content for allowing a user to more fully comprehend the content presentation. Systems for implementing the method are also provided.

16 Claims, 2 Drawing Sheets

(56) References Cited

U.S. PATENT DOCUMENTS

| | | | |
|---|---|---|---|
| 6,058,238 A | 5/2000 | Ng | |
| 6,263,502 B1* | 7/2001 | Morrison et al. | 725/47 |
| 6,438,751 B1 | 8/2002 | Voyticky et al. | |
| 6,512,919 B2 | 1/2003 | Ogasawara | |
| 6,556,273 B1 | 4/2003 | Wheeler et al. | |
| 6,704,929 B1 | 3/2004 | Ozer et al. | |
| 6,983,304 B2 | 1/2006 | Sato | |
| 7,046,161 B2 | 5/2006 | Hayes | |
| 7,206,029 B2 | 4/2007 | Cohen-Solal | |
| 7,206,409 B2 | 4/2007 | Antonellis et al. | |
| 7,221,405 B2* | 5/2007 | Basson et al. | 348/468 |
| 7,244,404 B2 | 7/2007 | Rosenberg et al. | |
| 7,328,848 B2 | 2/2008 | Xia et al. | |
| 7,349,668 B2 | 3/2008 | Ilan et al. | |
| 7,369,180 B2* | 5/2008 | Xing | 348/569 |
| 7,373,652 B1* | 5/2008 | Bayrakeri et al. | 725/53 |
| 7,387,250 B2* | 6/2008 | Muni | 235/462.01 |
| 7,394,519 B1 | 7/2008 | Mossman et al. | |
| 7,424,976 B2 | 9/2008 | Muramatsu | |
| 7,443,449 B2* | 10/2008 | Momosaki et al. | 348/468 |
| 7,487,527 B2* | 2/2009 | Ellis et al. | 725/38 |
| 7,587,601 B2 | 9/2009 | Levy et al. | |
| 7,604,172 B2 | 10/2009 | Onogi | |
| 7,612,748 B2 | 11/2009 | Tateuchi | |
| 7,624,417 B2 | 11/2009 | Dua | |
| 7,624,916 B2 | 12/2009 | Sato et al. | |
| 7,673,297 B1 | 3/2010 | Arsenault et al. | |
| 7,797,430 B2 | 9/2010 | Ichieda | |
| 7,841,531 B2 | 11/2010 | Onogi | |
| 8,010,977 B2 | 8/2011 | Hogyoku | |
| 8,045,054 B2* | 10/2011 | Bishop et al. | 348/468 |
| 8,186,572 B2 | 5/2012 | Herzig | |
| 8,292,166 B2 | 10/2012 | Gomez et al. | |
| 8,364,018 B2* | 1/2013 | McArdle | 386/248 |
| 8,386,339 B2 | 2/2013 | Minnick et al. | |
| 8,408,466 B2 | 4/2013 | Gratton | |
| 8,427,455 B2 | 4/2013 | Matsuda | |
| 8,430,302 B2 | 4/2013 | Minnick et al. | |
| 8,439,257 B2 | 5/2013 | Beals et al. | |
| 8,443,407 B2 | 5/2013 | Gaede et al. | |
| 8,468,610 B2 | 6/2013 | Beals et al. | |
| 8,511,540 B2 | 8/2013 | Anguiano | |
| 8,534,540 B2 | 9/2013 | Gratton et al. | |
| 8,550,334 B2 | 10/2013 | Gratton et al. | |
| 8,553,146 B2 | 10/2013 | Kennedy | |
| 2001/0037297 A1 | 11/2001 | McNair | |
| 2001/0052133 A1 | 12/2001 | Pack et al. | |
| 2002/0027612 A1 | 3/2002 | Brill et al. | |
| 2002/0049980 A1 | 4/2002 | Hoang | |
| 2002/0112250 A1 | 8/2002 | Koplar et al. | |
| 2003/0018711 A1 | 1/2003 | Imanishi | |
| 2003/0050854 A1 | 3/2003 | Showghi et al. | |
| 2003/0121978 A1 | 7/2003 | Rubin et al. | |
| 2003/0151562 A1 | 8/2003 | Kulas | |
| 2003/0172374 A1 | 9/2003 | Vinson et al. | |
| 2004/0019691 A1 | 1/2004 | Daymond et al. | |
| 2004/0026508 A1 | 2/2004 | Nakajima et al. | |
| 2004/0044532 A1 | 3/2004 | Karstens | |
| 2004/0046790 A1 | 3/2004 | Agarwal et al. | |
| 2005/0011958 A1* | 1/2005 | Fukasawa et al. | 235/462.46 |
| 2005/0015800 A1 | 1/2005 | Holcomb | |
| 2005/0015815 A1 | 1/2005 | Shoff et al. | |
| 2005/0055281 A1 | 3/2005 | Williams | |
| 2005/0059339 A1 | 3/2005 | Honda et al. | |
| 2005/0125301 A1 | 6/2005 | Muni | |
| 2005/0149967 A1 | 7/2005 | Hanley et al. | |
| 2005/0180804 A1 | 8/2005 | Andrew et al. | |
| 2005/0203854 A1 | 9/2005 | Das | |
| 2005/0262548 A1 | 11/2005 | Shimojo et al. | |
| 2005/0264694 A1 | 12/2005 | Ilan et al. | |
| 2006/0064700 A1 | 3/2006 | Ludvig et al. | |
| 2006/0071076 A1 | 4/2006 | Tamayama | |
| 2006/0079247 A1 | 4/2006 | Ritter | |
| 2006/0086796 A1 | 4/2006 | Onogi | |
| 2006/0095286 A1 | 5/2006 | Kimura | |
| 2006/0124742 A1 | 6/2006 | Rines et al. | |
| 2006/0196950 A1 | 9/2006 | Kiliccote | |
| 2006/0203339 A1 | 9/2006 | Kleinberger et al. | |
| 2006/0208088 A1 | 9/2006 | Sekiguchi | |
| 2006/0265731 A1 | 11/2006 | Matsuda | |
| 2007/0016934 A1 | 1/2007 | Okada et al. | |
| 2007/0016936 A1* | 1/2007 | Okada et al. | 725/136 |
| 2007/0017350 A1 | 1/2007 | Uehara | |
| 2007/0019215 A1 | 1/2007 | Yu | |
| 2007/0063050 A1 | 3/2007 | Attia et al. | |
| 2007/0073585 A1 | 3/2007 | Apple et al. | |
| 2007/0143788 A1 | 6/2007 | Abernathy et al. | |
| 2007/0192723 A1 | 8/2007 | Anzelde et al. | |
| 2007/0206020 A1 | 9/2007 | Duffield et al. | |
| 2007/0256118 A1 | 11/2007 | Nomura et al. | |
| 2008/0022323 A1 | 1/2008 | Koo | |
| 2008/0059998 A1 | 3/2008 | McClenny et al. | |
| 2008/0062164 A1 | 3/2008 | Bassi et al. | |
| 2008/0073434 A1 | 3/2008 | Epshteyn et al. | |
| 2008/0077324 A1 | 3/2008 | Hatano et al. | |
| 2008/0082684 A1 | 4/2008 | Gaos et al. | |
| 2008/0092154 A1 | 4/2008 | Hogyoku | |
| 2008/0112615 A1 | 5/2008 | Obrea et al. | |
| 2008/0156879 A1 | 7/2008 | Melick et al. | |
| 2008/0182561 A1 | 7/2008 | Kim et al. | |
| 2008/0189185 A1 | 8/2008 | Matsuo et al. | |
| 2008/0200153 A1 | 8/2008 | Fitzpatrick et al. | |
| 2008/0200160 A1 | 8/2008 | Fitzpatrick et al. | |
| 2008/0201078 A1 | 8/2008 | Fitzpatrick et al. | |
| 2008/0244675 A1 | 10/2008 | Sako et al. | |
| 2008/0267537 A1 | 10/2008 | Thuries | |
| 2008/0281624 A1 | 11/2008 | Shibata | |
| 2008/0288600 A1 | 11/2008 | Clark | |
| 2008/0307348 A1 | 12/2008 | Jones et al. | |
| 2009/0029725 A1 | 1/2009 | Kindberg | |
| 2009/0031071 A1 | 1/2009 | Chiu | |
| 2009/0031373 A1 | 1/2009 | Hogyoku | |
| 2009/0070699 A1 | 3/2009 | Birkill et al. | |
| 2009/0083808 A1 | 3/2009 | Morrison | |
| 2009/0088213 A1 | 4/2009 | Rofougaran | |
| 2009/0094546 A1 | 4/2009 | Anzelde et al. | |
| 2009/0108057 A1 | 4/2009 | Mu et al. | |
| 2009/0113334 A1 | 4/2009 | Chakra et al. | |
| 2009/0154759 A1 | 6/2009 | Koskinen et al. | |
| 2009/0157511 A1 | 6/2009 | Spinnell et al. | |
| 2009/0157530 A1 | 6/2009 | Nagamoto et al. | |
| 2009/0172780 A1 | 7/2009 | Sukeda et al. | |
| 2009/0179852 A1 | 7/2009 | Refai et al. | |
| 2009/0180025 A1 | 7/2009 | Dawson | |
| 2009/0212112 A1 | 8/2009 | Li | |
| 2009/0212113 A1 | 8/2009 | Chiu et al. | |
| 2009/0234570 A1 | 9/2009 | Sever | |
| 2009/0254954 A1 | 10/2009 | Jeong | |
| 2009/0293110 A1 | 11/2009 | Koga | |
| 2009/0294538 A1 | 12/2009 | Wihlborg et al. | |
| 2009/0303036 A1 | 12/2009 | Sahuguet | |
| 2009/0307232 A1 | 12/2009 | Hall | |
| 2009/0312105 A1 | 12/2009 | Koplar | |
| 2009/0320066 A1 | 12/2009 | Soldan et al. | |
| 2010/0017457 A1 | 1/2010 | Jumpertz et al. | |
| 2010/0020970 A1 | 1/2010 | Liu et al. | |
| 2010/0031162 A1 | 2/2010 | Wiser et al. | |
| 2010/0036936 A1 | 2/2010 | Cox et al. | |
| 2010/0053339 A1 | 3/2010 | Aaron et al. | |
| 2010/0081375 A1 | 4/2010 | Rosenblatt et al. | |
| 2010/0089996 A1 | 4/2010 | Koplar | |
| 2010/0096448 A1 | 4/2010 | Melick et al. | |
| 2010/0103018 A1 | 4/2010 | Yoon et al. | |
| 2010/0114715 A1 | 5/2010 | Schuster et al. | |
| 2010/0129057 A1 | 5/2010 | Kulkarni | |
| 2010/0131900 A1 | 5/2010 | Spetalnick | |
| 2010/0131970 A1 | 5/2010 | Falcon | |
| 2010/0131983 A1 | 5/2010 | Shannon et al. | |
| 2010/0138344 A1 | 6/2010 | Wong | |
| 2010/0149187 A1 | 6/2010 | Slavin et al. | |
| 2010/0154035 A1 | 6/2010 | Damola et al. | |
| 2010/0161437 A1 | 6/2010 | Pandey | |
| 2010/0163613 A1 | 7/2010 | Bucher et al. | |
| 2010/0201894 A1 | 8/2010 | Nakayama et al. | |

(56) References Cited

U.S. PATENT DOCUMENTS

| | | |
|---|---|---|
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007630 A1 | 1/2011 | Almhana et al. |
| 2011/0030068 A1 | 2/2011 | Imai |
| 2011/0039573 A1 | 2/2011 | Hardie |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |
| 2012/0117232 A1* | 5/2012 | Brown et al. ............ 709/224 |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2013/0068838 A1 | 3/2013 | Gomez et al. |
| 2013/0239157 A1 | 9/2013 | Gaede et al. |
| 2014/0046661 A1* | 2/2014 | Bruner ............ 704/235 |
| 2014/0076963 A1 | 3/2014 | Gratton et al. |
| 2014/0158762 A1 | 6/2014 | Gomez et al. |

FOREIGN PATENT DOCUMENTS

| | | |
|---|---|---|
| CN | 101 227 581 A | 7/2008 |
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| TW | 200926075 A | 6/2009 |
| TW | 201032139 A | 9/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2010/149161 A1 | 12/2010 |
| WO | 2011/009055 A2 | 1/2011 |

OTHER PUBLICATIONS

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y., "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

(56) References Cited

OTHER PUBLICATIONS

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work On Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 12/960,285, filed Dec. 3, 2010, Non-Final Office Action mailed Dec. 6, 2012, 17 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.
Extended European Search Report for EP 12152690.9 dated Jun. 19, 2012, 9 pages.
International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.

(56) References Cited

OTHER PUBLICATIONS

U.S. Appl. No. 12/971,349, filed Dec. 7, 2010), Final Rejection mailed Oct. 24, 2012, 11 pages.
U.S. Appl. No. 12/953,227, filed Nov. 23. 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/035,474, filed Feb. 25, 2011, Office Action mailed Oct. 30, 2012, 11 pages.
U.S. Appl. No. 13/037,312, filed Feb. 28, 2011, Office Action mailed Aug. 15, 2012, 9 pages.
International Preliminary Report on Patentability of PCT/US2011/059977 mailed on Jun. 6, 2013, 6 pages.
International Preliminary Report on Patentability of PCT/US2011/068161 mailed on Jul. 25, 2013, 13 pages.
International Preliminary Report on Patentability of PCT/US2012/025502 mailed Sep. 6, 2013, 9 pages.
Liu, Yue et al., "Recognition of QR code with mobile phones," Control and Decision Conference, 2008. CCDC 2008. Jul. 2-4, 2008, pp. 203, 206.
U.S. Appl. No. 12/961,369, filed Dec. 6, 2010, Non-Final Office Action mailed Mar. 25, 2013, 17 pages.
U.S. Appl. No. 12/971,349, filed Dec. 7, 2010 ), Notice of Allowance mailed Oct. 2, 2013, 24 pages.
U.S. Appl. No. 12/981,244, filed Dec. 29, 2010, Final Office Action mailed Oct. 30, 2013, 10 pages.
U.S. Appl. No. 13/016,483, filed Jan. 28, 2011 Final Office Action mailed Jun. 27, 2013, 13 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/037,316, filed Feb. 28, 2011, Final Office Action mailed Aug. 28, 2013, 13 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Final Office Action mailed Sep. 9, 2013, 10 pages.
U.S. Appl. No. 13/673,480, filed Nov. 9, 2012 Notice of Allowance mailed Nov. 12, 2013, 16 pages.
U.S. Appl. No. 13/475,794, filed May 18, 2012 Non-Final Office Action mailed Sep. 18, 2013, 19 pages.
U.S. Appl. No. 12/964,478, filed Dec. 9, 2010 Non-Final Office Action mailed Mar. 26, 2013, 19 pages.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 12/953,227, filed Nov. 23, 2010, Final Office Action mailed May 24, 2013, 17 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
Extended European Search Report for EP 11842890.3 dated Mar. 26, 2014, 8 pages.
Extended European Search Report for EP 11850819.1 dated Mar. 17, 2014, 5 pages.
Extended European Search Report for EP 11846486 dated Mar. 26, 2014, 5 pages.
Extended European Search Report for EP 11852630 dated Jun. 30, 2014, 7 pages.
International Preliminary Report on Patentability of PCT/US2012/048032 mailed on Apr. 3, 2014, 6 pages.
International Preliminary Report on Patentability of PCT/US2011/063111 mailed Jun. 13, 2013, 8 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp-8, XP031887368, DOI: 10.1109/MTAS.2005.207166; ISBN: 978-981-05-4573-4, 8 pages.
Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100142966 dated May 27, 2014, 6 pages.
Office Action for European Patent Application No. 12719817.4 dated Jun. 23, 2014 issued in the corresponding foreign application, 5 pages.
U.S. Appl. No. 14/179,336, filed Feb. 12, 2014 Non-Final Office Action mailed May 22, 2014, 14 pages.
U.S. Appl. No. 12/961,369, filed Dec. 6, 2010, Notice of Allowance mailed Jul. 16, 2014, 15 pages.
U.S. Appl. No. 12/981,244, filed Dec. 29, 2010, Notice of Allowance mailed Mar. 25, 2014, 17 pages.
U.S. Appl. No. 12/965,645, filed Dec. 10, 2010, Final Office Action, mailed Mar. 18, 2014, 24 pages.
U.S. Appl. No. 12/965,645, filed Dec. 10, 2010, Notice of Allowance, mailed Jun. 20, 2014, 35 pages.
U.S. Appl. No. 13/028,030, filed Feb. 15, 2011, Final Office Action mailed Jul. 11, 2014, 43 pages.
U.S. Appl. No. 12/960,285, filed Dec. 3, 2010, Non-Final Office Action mailed Jun. 6, 2014, 19 pages.
U.S. Appl. No. 13/006,270, filed Jan. 13, 2011, Final Office Action mailed May 9, 2014, 41 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Notice of Allowance mailed May 2, 2014, 40 pages.
U.S. Appl. No. 12/961,369, filed Dec. 6, 2010, Non-Final Office Action mailed Feb. 13, 2014, 21 pages.
U.S. Appl. No. 13/010,557, filed Jan. 20, 2011, Final Rejection mailed Jan. 16, 2014, 17 pages.
U.S. Appl. No. 13/010,557, filed Jan. 20, 2011, Non-Final Rejection mailed Aug. 5, 2013, 17 pages.
U.S. Appl. No. 13/192,287, filed Jul. 27, 2011, Final Office Action mailed Jan. 28, 2014, 18 pages.
U.S. Appl. No. 13/035,474, filed Feb. 25, 2011, Non Final Rejection mailed Mar. 6, 2014, 20 pages.
U.S. Appl. No. 13/968,611, filed Aug. 16, 2013, Non-Final Office Action mailed Jan. 17, 2014, 21 pages.

\* cited by examiner

MATRIX CODE-BASED ACCESSIBILITY

FIELD OF THE DISCLOSURE

The present disclosure relates generally to an interface for television programming. More particularly, the present disclosure relates to QR codes presented on a display for scanning, where the codes have accessibility content stored therein.

SUMMARY

In one embodiment, a method of presenting a matrix code for providing accessibility content may include receiving, at a content receiver, a signal carrying accessibility content, generating, at the content receiver, a matrix code from the accessibility content, and transmitting the matrix code as part of a content presentation to a presentation device for display, wherein the content presentation includes at least one of audio and visual content and the accessibility content includes an alternative form of at least one of the audio and the visual content for allowing a user to more fully comprehend the content presentation.

In variations of this embodiment, the signal carrying the accessibility content may include the content presentation. The content receiver may transmit the matrix code in response to a user indication. Furthermore, the content receiver may transmit the matrix code in a user-indicated configuration. The user-indicated configuration may include a size of the matrix code on the presentation device and/or a position of the matrix code on the presentation device.

In further variations of this embodiment, the matrix code may be displayed on the presentation device continuously throughout the content presentation, or intermittently throughout the content presentation. More than one matrix code may be displayed on the presentation device throughout the content presentation. The accessibility content may include visual information regarding the content presentation. In this manner, the visual information may be provided in a format for use with a Braille writer. Alternatively or additionally, the accessibility content may include audio information regarding the content presentation. Furthermore, the matrix code may define a two dimensional pattern that embodies data. Thus, the matrix code may be a QR code.

In another embodiment, a method of generating a matrix code representing accessibility content may include receiving, at a content receiver, a signal carrying data relating to a content presentation and to the accessibility content; and generating, at the content receiver, a matrix code from the data relating to the accessibility content, wherein the content presentation includes at least one of audio and visual content and the accessibility content includes an alternative form of at least one of the audio and the visual content for allowing a user to more fully comprehend the content presentation.

In variations of this embodiment, the matrix code and the content presentation may be displayed simultaneously on a presentation device. The presentation device may be a television. Furthermore, the content receiver may be a connected and integral part of the presentation device.

In further embodiments, a method of generating a matrix code having accessibility content for allowing a user to more fully comprehend a content presentation having at least one of audio and visual content may include receiving, at a content receiver, a signal carrying data relating to the accessibility content and generating, at the content receiver, a matrix code from the data relating to the accessibility content and configured in a format for use with a Braille writer, wherein the accessibility content includes an alternative form of at least one of the audio and the visual content of the content presentation.

In still further embodiments, a system may include an input that receives a broadcast signal carrying accessibility content, a processor that receives the broadcast signal and that generates a matrix code that includes the accessibility content, and an output that transmits the matrix code to a presentation device for display.

In still other embodiments, a system may include an optical device configured to capture a matrix code presented with an audiovisual presentation, a processor in communication with the optical device configured to receive the matrix code from the optical device and transform the matrix code into accessibility data readable by the accessibility device, and an accessibility device interface component in communication with an accessibility device and the processor configured to output the accessibility data to the accessibility device. The accessibility device may provide accessibility information to a user based on the received accessibility data.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
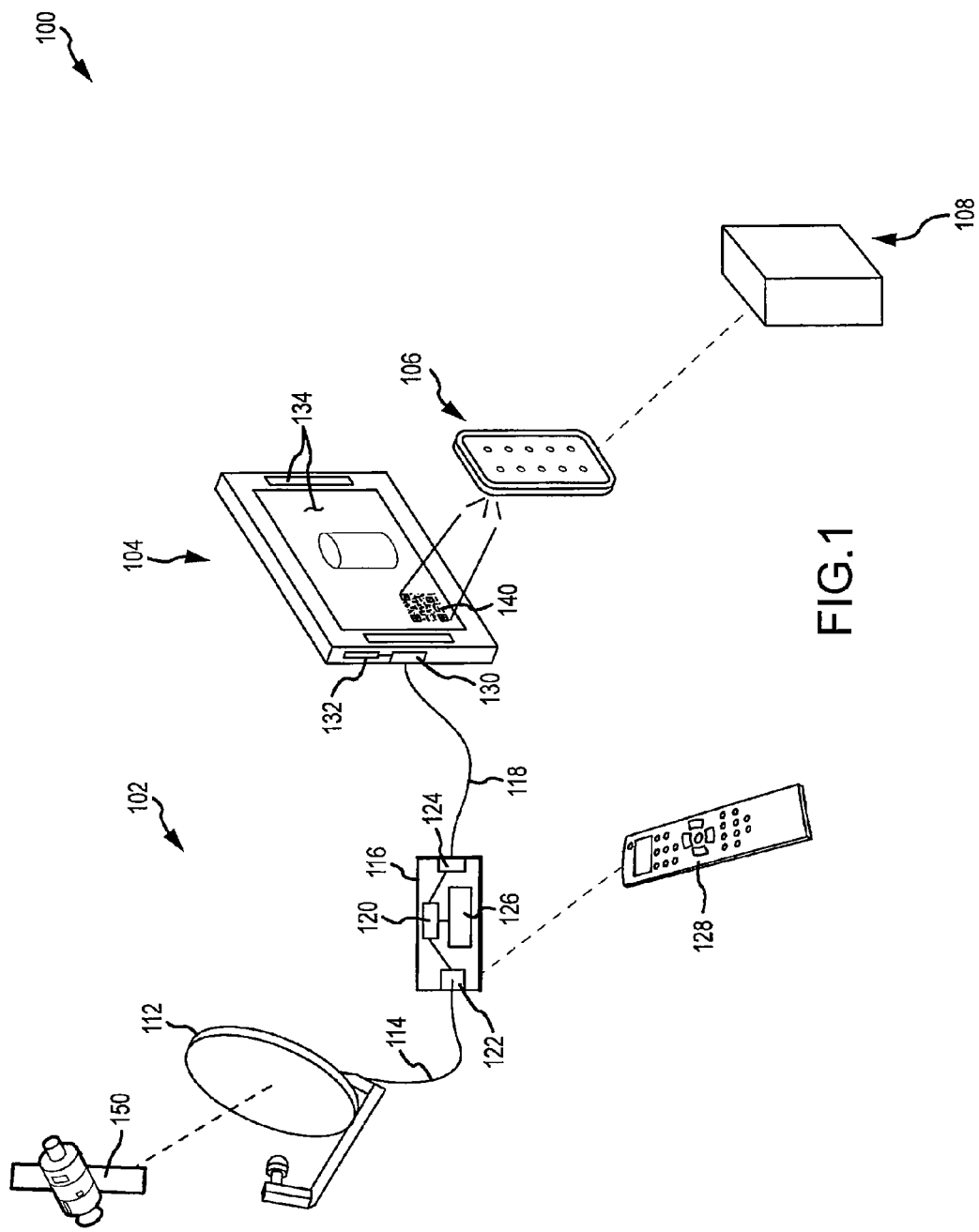
FIG. 1 is a diagram illustrating a system for transmitting audiovisual and accessibility content to a user, according to certain embodiments.

The description that follows includes sample systems and methods that embody various elements of the present disclosure. However, it should be understood that the described disclosure may be practiced in a variety of forms in addition to those described herein.

Audiovisual programming generally involves transmitting signals carrying audiovisual content to a receiver. Generally, the audiovisual content includes one or more streams of data supporting several viewable programs at any given time. As such, the signals may be processed and the audiovisual content may be selectively displayed on a presentation device by, for example, selecting a particular channel. It should be appreciated that selecting a channel does not necessarily require tuning to a particular frequency but instead selecting a different group of data streams (typically identified by packet identifiers, or PIDS) for processing and/or display.

In addition to audiovisual content, the streams of data may include accessibility content relating to one or more of the audiovisual signals. In one embodiment, accessibility content may refer to any information, whether presented in an audio, visual, or tactile form, that allows persons having one or more impairments, disabilities, infirmities, language barriers, or any other condition to more fully comprehend the audiovisual content provided through the presentation device. That is, the accessibility content may include an alternative form of the visual aspect of the audiovisual content or it may include an alternative form of the audio aspect of the audiovisual content or it may include some combination of alternative forms of the both the visual and audio aspects of the content. Existing accessibility content, which is currently supported on many presentation devices, includes closed captioning, wherein the audio aspect of a content presentation is provided in an alternative textual form displayed on a portion of the presentation device corresponding to the audiovisual stream in order to allow hearing-impaired persons to read content that is otherwise presented as audio. Furthermore, bilingual content may be available in some systems, such that the audio is provided in two languages, e.g., English and Spanish, to allow the user to select a desired language.

The present disclosure relates to systems and methods for receiving accessibility content from a television provider as well as methods associated with presenting and/or receiving the accessibility content. In some embodiments, the system includes a satellite configured to receive transmissions and instructions from a satellite provider. The methods, in some embodiments, involve producing a matrix code, such as a QR code, and associating the matrix code with audiovisual content. Specifically, the matrix code may contain data relating to accessibility content for association with the audiovisual content. A user may scan the code using any device capable of reading (scanning) the matrix code and converting the code into transmittable accessibility content. The transmittable accessibility content may be transmitted to an accessibility device, for receipt by the user. In this manner, a QR code may be produced and associated with a television program. The QR code may be viewable on the presentation device while the television program is being displayed. Thus, the accessibility content may be presented concurrently with the television program to which such information relates, and it may be concurrently received by the reading device (reader), and thereafter transmitted to the accessibility device wherein the user may receive the accessibility content.

In one embodiment, the accessibility content may be visual information related to the television program (for example, descriptions of scenes, descriptions of characters, descriptions of actions, and other description of the visual content of the television program) translated into Braille, the reading device may be an optical scanner, and the accessibility device may be a Braille writer. In this embodiment, the matrix code may contain accessibility content relating to the visual content of a television program which would not be viewable by persons having visual impairments. For example, the accessibility content may include a narration of a television program allowing a person with visual impairments to "hear" the television program, or the narration may be translated into Braille such that the person may use their sense of touch with a Braille writer to read the visual aspects of the program.

In this or another embodiment, the receiving device and the transmitting device may be, or may be a part of, the same device. Thus, a single device may be provided to read the accessibility content from the displayed matrix code on the presentation device, and transmit such accessibility content to the user. Other embodiments and variations of those mentioned will be described below.

Referring now to FIG. 1, a sample system 100 for performing the methods described herein is shown. As shown, the system 100 may include a receiver 102 for receiving audiovisual programs and matrix code information. The system 100 may also include a presentation device 104 for displaying the audiovisual programs and matrix code. The system 100 may also include a reader 106 for reading information displayed on the presentation device 104, which may be in the form of a matrix code 140. The reader 106 may be in communication with an accessibility device 108 for providing the accessibility content captured from presentation device 104 to a user.

The receiver 102 may be configured to receive a signal carrying a broadcast television program, a program guide, a menu, a movie or other audiovisual content. The receiver 102 may also be configured to receive associated metadata or other data information carried by the signal. The receiver 102 may further be configured for transmitting the content to the presentation device 104 for viewing, listening, or both. As such, the receiver 102 may be in the form of a set top box 116, other television receiver box (such as a cable box, network-enabled box, and the like) or a satellite system as shown including a dish 112, cabling 114 leading to the set top box 116, and cabling 118 leading to the presentation device 104, for example. Other examples of a receiver 102 may include an antenna system employing an analog or digital antenna connected by cabling leading either to a television receiver or directly to the presentation device 104. Still other examples may include a cable system including an incoming cable leading directly to a presentation device 104 or to a presentation device via a set top box.

In some embodiments, the receiver 102 may be configured to convert, configure, or otherwise modify the display prior to transmitting it to the presentation device for viewing. The receiver may further be configured for storing and displaying audiovisual content. The receiver may thus be in the form of a computer-type device having one or more processing units 120, one or more inputs 122, one or more outputs 124, and one or more computer readable storage media 126 (which may take the form of, but is not limited to: a magnetic storage medium; optical storage medium; magneto-optical storage medium; read only memory; random access memory; erasable programmable memory; flash memory; non-transitory storage media; and so on).

In some embodiments, these computer-type elements may be incorporated into a set top box 116 for receiving a broadcast, program guide information, audio and video streams, other audiovisual content, data, or other information. The set top box 116 may receive the information through the one or more inputs 122, process or store the incoming information, and selectively output information to the presentation device 104 for viewing and interaction by a viewer. For example, the viewer may select which television channel he would like to watch, select from time-shifted television programs stored in the storage medium, or select movies from a video-on-demand menu, for example. In another example, the viewer may navigate an electronic program guide or other series of menus, which may be output to the presentation device 104. Instructions executed by the processor 120 may be stored in the storage medium 126 or received through the one or more inputs 122 or both. The set top box 120 may include a remote control 128 for remote interaction with the viewer. In still other embodiments, some or all of these aspects of the receiver 102 may be connected and integral with the presentation device 104 described below. For example, a presentation device 104 in the form of a television may include some or all of these elements.

The presentation device 104 may include one or more inputs 130 for receiving information from the receiver and an electronic device 132 for receiving information from the one or more inputs 130 and transmitting the information to a display screen, speaker, or other output 134. The presentation device 104 may be a television, computer monitor, or other device for presenting a viewer with visual and/or audio stimuli.

The reader 106 may be a remote device configured for optically scanning information from the presentation device 104. The reader 106, like the receiver 102 described above, may also be a computer-type device having one or more inputs, a processor, a computer readable storage medium, and one or more outputs. One of the inputs of the reader 106 may include an optical receiver configured for receiving and recording light patterns. The optical receiver may be a digital optical receiver similar to that found in digital cameras and some mobile phones. In some embodiments, the reader 106 may be in the form of a dedicated optical scanner, a personal digital assistant (PDA), a portable computing device, a tablet computer, a smartphone and the like. The reader 106 may receive image input, for example, from the optical receiver and the processor may access processing instructions for the image from the computer readable storage medium. That is, in some embodiments, the reader 106 may have decoding software stored in the storage medium for decoding matrix codes. In some embodiments, the software may include an "auto run" feature so that decoding software automatically executes when a matrix code is scanned and recognized. The processor may process the image produced by the optical receiver and may follow additional instructions produced by the processing of the image. In at least one embodiment, the processor receives an image captured by the optical receiver, such as an image including a matrix code, and transforms the matrix code into accessibility data readable by an accessibility device, such as a Braille writer.

The reader 106 may have data transmitting capabilities, such as, for example, by hardwired connection, a wireless network, or another electronic data connection. Thus, the reader 106 may be capable of transmitting the decoded information from the matrix code, which may be accessibility content, to an accessibility device 108. In at least one embodiment, the reader 106 includes an accessibility device interface component configured to output data to the accessibility device 108. For example, the accessibility device interface component may output Braille data for presentation by the accessibility device 108. The accessibility device 108 may be configured to receive accessibility content transmitted from the reader 106, and thereafter provide a user with the accessibility content. In one embodiment, the reader 106 and the accessibility device 108 may be the same device, or a may be a part of the same device, such that the procedure of transmitting the data representing the accessibility content is not necessary. For example, the accessibility device 108 may be provided with a camera or other image-capture device, as well as appropriate software to recognize, decode and/or process a captured matrix code. Thus, in this embodiment, the same device may read the matrix-based code, and directly provide the accessibility content encoded therein to the user.

Figure 2:
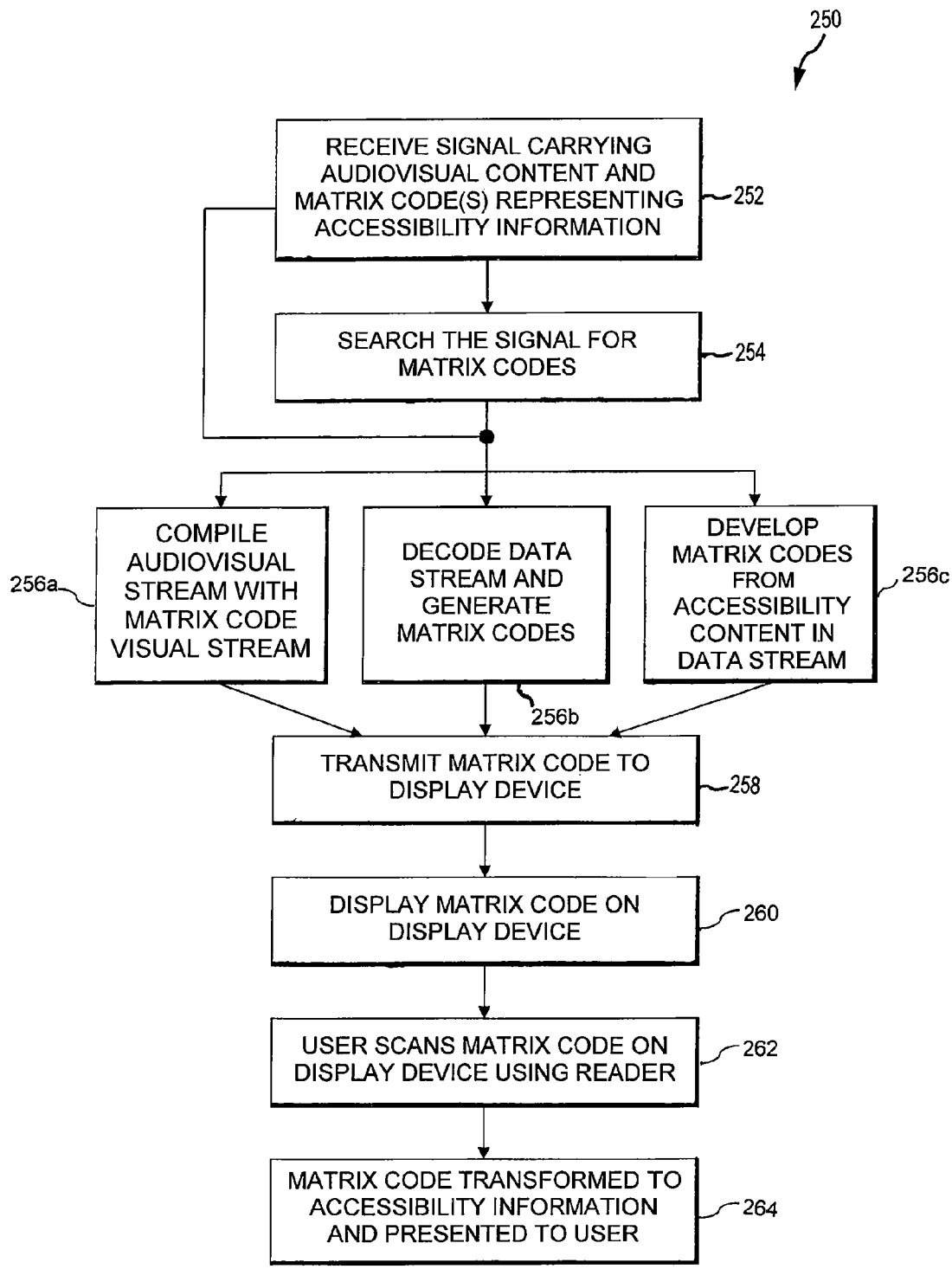
FIG. 2 is a diagram illustrating a method for transmitting audiovisual and accessibility content to a user, according to certain embodiments.

Having described a system 100 upon which the current methods may be performed, reference is now made to FIG. 2, which illustrates a process for using matrix codes displayed in programming content to provide accessibility content to a user. For example, accessibility content in the form of a textual description of the visual programming content may be embedded in a television program. This textual description may describe various elements of the programming content instead of, or in addition to, providing a transcript of the audio portion of the content. For example, the textual description may set out the actions of persons, animals, and the like as they occur, locations shown in the content, actions taking place, and so on. In some embodiments, the textual description may also include (or take the form solely of) a transcript of some or all of the audio portion of content.

A viewer of the television program may scan the matrix code in the display with a reader, for example, and the reader may decode the accessibility content and transmit it to an accessibility device, such as a Braille writer. In this fashion, a user with a visual impairment may be able to read the output of the Braille writer as the program is shown, thereby allowing the user to enjoy the program to a greater degree than if he were just listening to the audio portion of the program.

Before discussing the operations performed in the method, additional information is provided with regard to the programming content, the matrix codes included therein, and the information in the matrix codes. The programming content may be in the form of live television, pre-recorded television, movies, on-demand programming, or any other form of audiovisual content which may be provided from a content provider. In general, such content is produced by third parties, such as a television or movie production studio, and is then transmitted to the television signal provider for simultaneous or eventual broadcast or transmission to the user, via the transmission media described above, to the display device.

The programming content may include a matrix code, such as a QR code, that is presented to the user for viewing and/or capturing, such as scanning with a reader 106. The matrix code may be visible throughout the programming or it may appear for a portion thereof. The matrix code may be provided on the entire display device (i.e., in place of the visual portion of the programming), or it may be provided on only a portion thereof. In this manner, a person with visual impairment may choose to have the matrix code displayed on the entire display device if there is no one else watching the programming; however, if the visually impaired person is watching the programming with normal sighted persons, then the matrix-code may be displayed in only a portion of the display device to allow the sighted persons to view the visual portion of the programming content. Moreover, the user may choose not to have the matrix code displayed on the display device at all.

As the accessibility content may be provided in the transmission signal along with the audiovisual content, the user may use the set-top box 116 or other like device to select the configuration (size, positioning, etc.) of the matrix code on the display device, including selecting whether or not the code will be present at all. The set-top box may execute the user's instructions by providing the display device with both the user's selected programming and the user's selected accessibility content. The receiver may thus have a menu stored in the computer readable storage medium that is accessible by a key pad on the set top box or a via a remote control. The user may interact with the set top box using the menu and the set top box may filter or otherwise reconfigure the incoming signal to display the audiovisual content and data as selected by the user.

An exemplary matrix code 140, as depicted in FIG. 1, is a two-dimensional display (such as a QR code) defining patterns and regions that embody data, similar to a bar code. The matrix code 140 may take the form of alternating black and white elements, such as squares or other geometric shapes. The two-dimensional nature of the display may generally allow for more data to be stored than a typical bar code. While the present disclosure is related to the use of two-dimensional matrix codes 140, other data storing/displaying images or systems may also be used. For example, holographic images allowing for three-dimensional storage of data may be used, as may changing images that allow for recording and/or display of information over time. Each of these and other methods for storing information in a display may be used and are considered to be included in the term "matrix code" 140. The matrix code 140 may be embedded in the visual portion of the content as transmitted by the content or signal provider, or may be constructed by the set-top box 116 from data provided as part of the transmission and then overlaid, as appropriate, on the visual portion for display. In the latter embodiment, the set-top box may store and execute an application to construct a matrix code from data provided to the set-top box, thus rendering a QR code that may be captured by the reader and processed by the appropriate device (e.g., the reader 106, the accessibility device 108, and the like).

The matrix codes 140 in the present embodiment may store accessibility data representing accessibility content. Accessibility data, in one embodiment, may relate to any type of information or content that would allow a person with an impairment to more fully sense, or otherwise receive, and enjoy the programming. As previously discussed, accessibility data may include a textual description of the visual programming content. In this manner, a person having a visual impairment may be able to receive such visual information via a Braille writer or other medium, in lieu of actually seeing the content. Greater or lesser levels of accessibility content are possible. For example, the content may simply describe the general scene of the programming, for example, every time the scene changes. In other examples, the content may fully describe certain or all scenes, backgrounds, actions, and other information occurring in the program. In some embodiments, the described accessibility content may be in the form of a narration of greater or lesser detail that allows a person with visual impairments to understand what the visual content of the audiovisual content is showing. As such, the user may hear the audio content and associate the audio content with the visual content.

Other types of accessibility content are possible. For example, the matrix code may be configured to provide textual information to a person with a hearing impairment. In this manner, the textual information could be displayed to the user on a device that is connected to (or is a part of) the reader 106 to allow the user to read the audio content. In a further example, the matrix code may be configured to provide textual or audio information in a language other than the broadcast language. In this manner, the textual or audio information could be provided to the user on a device that is connected to (or is a part of) the reader 106 to allow the user to read or listen to the audio content in another language.

Matrix codes having accessibility content stored therein may be provided at any interval and in any number throughout the course of the selected audiovisual content. For example, a single matrix code may be displayed at the beginning of the program. Alternatively, numerous codes may be displayed at regular intervals throughout the program, e.g., every minute, 30 seconds, 15 seconds, etc. In still other embodiments, the matrix codes may be spaced throughout the program at the beginning, or end, or each scene of the program. It is generally anticipated that a greater frequency of code presentation will correspond with a higher level of accessibility content being provided, though this may not be the case. In all cases, the set-top box 116 or other like device may be responsible for receiving the accessibility content from the signal, and presenting the content in the form of a matrix code on the display device.

The accessibility content may be supplied by the content provider. For example, a producer of a movie may develop, or have developed, accessibility content for its movie. At the time of developing the accessibility content, a matrix code 140 and any associated features may be included in the movie. The matrix code 140 may be included in a data stream associated with the program or it may be included in a secondary visual stream. When a network or other program providing entity assembles programming they may include the accessibility content in their programming. Accordingly, the receiver in the system above may receive the accessibility content together with the program or other audiovisual content being provided by the television signal provider and may selectively display portions of the signal.

In another embodiment, the accessibility content may be supplied by the television signal provider. At the time of receiving the content from the content provider, the television signal provider may develop and embed the accessibility content along with the regular content signal and, as above, may embed the content as a data stream or a secondary visual stream. Thus, as above, the receiver in the system above may receive the accessibility content together with the program or other audiovisual content being provided by the television signal provider and may selectively display portions of the signal.

With this background regarding programming content, matrix codes, and the data stored therein, the method 250 (FIG. 2) may be described in more detail. The method 250 may be performed by all or a portion of the system 100 of FIG. 1. The method may also be performed by other systems.

Turning now to the embodiment shown in FIG. 2, the receiver 102 may receive a signal carrying audiovisual programming content (252), such as a television program, a movie, or an on-demand program, for example. In addition to audiovisual content, the signal may include accessibility content stored therein or provided in an additional data stream, visual stream, or other stream associated with the audiovisual content. The accessibility content may be in the form of one or more matrix codes or data that may be compiled into a matrix code or series of codes. The received signal, of course, may be any programming content signal. For example, the signal may be a television broadcast signal carrying a live program or it may be a signal carrying a program guide or other menu. As such, the signal received by the receiver 102 may include several forms and may be carrying at least one of several types of audiovisual content and associated accessibility content.

Having received a signal carrying programming content with possibly additional accessibility content (252), the receiver 102 may search the signal for any matrix codes or otherwise available accessibility content which may be present (254). In other embodiments, the receiver 102 may be pre-configured or selectively configured via a menu to receive accessibility content from a particular stream of the transmitted signal. As such, the search step (254) may be omitted, as shown in FIG. 2.

Depending on the nature of the accessibility content, the receiver 102 may generate a matrix code 140 in a format for graphical display. Generating a matrix code 140 may be done in several manners, depending on how the matrix code data is received into the receiver 102. In some embodiments, the matrix codes 140 may be received in a visual stream apart from the audiovisual content and the receiver 102 may display the visual stream together with the audiovisual content. The relationship of the matrix code visual stream to the audiovisual content may be selected via menu by the user and the receiver 102 may compile the audiovisual content and matrix code visual stream to suitably display the matrix visual stream together with the audiovisual content (256a). This may include replacing the visual aspect of the audiovisual content with the matrix code visual stream or it may include coordination between the two. In some other embodiments, matrix codes may be present in a data stream and may be received and read or decoded by the receiver 102 (256b). The receiver 102 may then generate matrix codes 140 for visual display and embed them in the audiovisual content or display them along with or in place of the visual aspect of the audiovisual content. In still other embodiments, the receiver 102 may receive a data stream including accessibility content and may develop matrix codes 140 by grouping portions of the accessibility content and generating a matrix code or codes 140 and associating the code or codes 140 with the audiovisual content (256c). Any of the above embodiments or combinations thereof may be included in procedures (256a, 256b, 256c) of generating a matrix code 140 in format for display. It will be appreciated that, in certain embodiments, two or more procedures (256a, 256b, 256c) may be performed, depending on how the matrix code data is received.

Having received a signal (252), possibly searched for accessibility content (254), and generated a matrix code for display (256), the receiver may then transmit the matrix code 140 (258) to the display device to be displayed (260). The transmission may correspond to the generated matrix code 140. That is, for example, where the accessibility content is replacing a portion of the audiovisual content, the transmission may include the accessibility content in the form of one or matrix codes 140 and the portion of the audiovisual content not replaced.

Once a program including matrix codes 140 has been output to a presentation device 104, a viewer may scan a matrix code when it is presented on the presentation device 104 (262). The matrix code 140 may have accessibility data, representing accessibility content, stored therein. The viewer may direct the optical receiver portion of a reader 106 toward the presentation device 104 when the presentation device 104 is displaying a matrix code 140. The viewer may then actuate the optical receiver by, for example, depressing a shutter button. In other embodiments, the optical receiving is in an "always on" configuration, i.e., it may capture the matrix code without input from the user. The reader 106 may thus capture an image of the matrix code 140. In some embodiments, the viewer may zoom, focus, or otherwise direct the reader toward the portion of the presentation device displaying the matrix code. In some embodiments, the reader 106 may be in a stationary position relative to the presentation device 104 and may be focused on all or a respective portion of the presentation device 104 such that it may capture matrix codes 140 as they are available and without the need for focusing, directing, or otherwise positioning the reader 106.

As mentioned above, the reader 106 may include an auto run feature causing the reader 106 to begin the decoding process when a matrix code 140 has been captured. In other cases, the viewer may deliberately select software resident on the reader 106 and direct the software to decode the captured image of the matrix code 140. The software may decode the image thus producing the accessibility content. The accessibility content may be transmitted to an accessibility device, such as a Braille writer, or the reader 106 may be a part of the accessibility device, in which case the accessibility device 108 may have the accessibility content directly available to it. The accessibility device 108 may then provide the accessibility content to the user, in a manner depending on the type of device, as is known in the art (264).

The overall process of the method for generating a matrix code 250 may be advantageous for several reasons. For example, the process may allow a television service provider to make accessibility content available to a user to enhance the user's ability to experience the program, particularly when the user has a visual, audio, or other impairment. At the same time, the user may enjoy the programming with other persons who do not have impairments, because the matrix-code may be displayed on only a portion of the display device, and the accessibility content may be provided directly to the individual user (as opposed to completely altering the audio or visual presentation from the display device). The user may have the option to turn on or off the matrix code display at any time, and to configure the code size and display positioning to suit the user's needs.

In the present disclosure, the methods disclosed may be implemented as sets of instructions or software readable by a device. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method of presenting a matrix code for providing accessibility content, comprising:
   receiving, at a content receiver, a signal carrying the accessibility content;
   generating, at the content receiver, a matrix code from the accessibility content;
   receiving a user indication requesting the accessibility content; and
   transmitting the matrix code as part of a content presentation to a presentation device for display in response to the user indication, wherein:
the content presentation includes at least one of audio and visual content; and
the accessibility content includes an alternative form of at least one of the audio and the visual content for allowing a user to more fully comprehend the content presentation, wherein the accessibility content provides visual information regarding the content presentation, and wherein the visual information includes a narration of the visual aspects of the content presentation.

2. The method of claim 1, wherein the signal carrying accessibility content includes the content presentation.

3. The method of claim 1, wherein the user indication includes a user-indicated configuration.

4. The method of claim 3, wherein the user-indicated configuration includes at least one of a size of the matrix code on the presentation device and a position of the matrix code on the presentation device.

5. The method of claim 1, wherein the visual information is provided in a format for use with a Braille writer.

6. The method of claim 1, wherein the accessibility content provides audio information regarding the content presentation.

7. A system, comprising:
an input that receives a broadcast signal carrying accessibility content;
a processor that receives the broadcast signal, generates a matrix code that includes the accessibility content, and receives a user indication requesting the accessibility content wherein the accessibility content provides visual information regarding a content presentation, and wherein the visual information includes a narration of the visual aspects of the content presentation; and
an output that transmits the matrix code to a presentation device for display in response to receiving the user indication.

8. The system of claim 7, wherein the content receiver is a connected and integral part of the presentation device.

9. The system of claim 7, wherein the processor compiles the audiovisual content and matrix code visual stream to suitably display the matrix code visual stream together with the audiovisual content.

10. The system of claim 7, wherein the processor is configured to read or decode the matrix codes from the broadcast signal and arrange the matrix codes relative to the audiovisual content.

11. The system of claim 10, wherein the processor is configured to output the matrix codes in place of the visual aspect of the audiovisual content.

12. The system of claim 7, wherein the processor is configured to develop matrix codes from a data stream including accessibility content and group portions of the accessibility content for the matrix codes.

13. A system, comprising:
an optical device configured to capture a matrix code presented with an audiovisual presentation;
a processor in communication with the optical device configured to receive the matrix code from the optical device and transform the matrix code into accessibility data readable by the accessibility device, wherein the accessibility data provides visual information regarding a content presentation, and wherein the visual information includes a narration of the visual aspects of the content presentation; and
an accessibility device interface component in communication with an accessibility device and the processor configured to output the accessibility data to the accessibility device, the accessibility device comprising a Braille writer and providing accessibility information comprising the narration of the visual aspects of the content presentation to a user based on the received accessibility data.

14. The system of claim 13, wherein the optical device captures the matrix code responsive to a user input.

15. The system of claim 13, wherein the optical device captures a plurality of matrix codes, responsive to the user input, each of the matrix codes associated with a portion of the accessibility information related to the audiovisual content.

16. The system of claim 13, wherein the accessibility device, the optical device and the accessibility device interface component are integrated into a single device.

* * * * *